(12) United States Patent
Struziak et al.

(10) Patent No.: US 8,967,866 B2
(45) Date of Patent: Mar. 3, 2015

(54) HYDRODYNAMIC BEARING

(75) Inventors: Ronald Struziak, Longmeadow, MA (US); Christopher McAuliffe, Windsor, CT (US); Brent Merritt, Southwick, MA (US); Seth Rosen, Middletown, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1893 days.

(21) Appl. No.: 11/741,999

(22) Filed: Apr. 30, 2007

(65) Prior Publication Data

US 2008/0260308 A1 Oct. 23, 2008

Related U.S. Application Data

(60) Provisional application No. 60/913,487, filed on Apr. 23, 2007.

(51) Int. Cl.
*F16C 17/04* (2006.01)
*F16C 17/02* (2006.01)

(52) U.S. Cl.
CPC ............... *F16C 17/024* (2013.01); *F16C 17/04* (2013.01)
USPC ........................................... 384/105

(58) Field of Classification Search
USPC ................................ 384/103–106
See application file for complete search history.

(56) References Cited

U.S. PATENT DOCUMENTS

| | | | |
|---|---|---|---|
| 4,082,375 A | 4/1978 | Fortmann | |
| 4,208,076 A * | 6/1980 | Gray et al. | 384/105 |
| 4,213,657 A | 7/1980 | Gray | |
| 4,247,155 A | 1/1981 | Fortmann | |
| 4,277,111 A | 7/1981 | Gray et al. | |
| 4,277,113 A * | 7/1981 | Heshmat | 384/124 |
| 4,415,280 A * | 11/1983 | Agrawal | 384/103 |
| 4,415,281 A | 11/1983 | Agrawal | |
| 4,462,700 A | 7/1984 | Agrawal | |
| 4,597,677 A | 7/1986 | Hagiwara et al. | |

(Continued)

FOREIGN PATENT DOCUMENTS

| | | |
|---|---|---|
| EP | 0717207 | 6/1996 |
| JP | 61-124722 A | 6/1986 |

(Continued)

OTHER PUBLICATIONS

Japanese Office Action for JP Application No. 2008-109711, Feb. 16, 2010.

(Continued)

*Primary Examiner* — Thomas Diaz
(74) *Attorney, Agent, or Firm* — Carlson, Gaskey & Olds, P.C.

(57) ABSTRACT

A hydrodynamic bearing is provided that includes an annular main foil having axially spaced inner and outer surfaces. Bump foils are supported circumferentially on the outer surface. Top foils are supported circumferentially on the inner surface opposite the bump foils. In one example, spacers are arranged between the top foils and the main foils. The spacers can be provided by chemically etching the main foil, in one example. The bump foils include first and second corrugated portions respectively providing first and second axially heights. The first axial height is less than the second axial height and is arranged at a leading edge of the bump foil relative to the direction of airflow across the hydrodynamic bearing.

15 Claims, 2 Drawing Sheets

(56) References Cited

U.S. PATENT DOCUMENTS

| | | | |
|---|---|---|---|
| 4,668,106 A | 5/1987 | Gu | |
| 5,110,220 A | 5/1992 | Gu | |
| 5,248,205 A | 9/1993 | Gu et al. | |
| 5,318,366 A | 6/1994 | Nadjafi | |
| 5,498,082 A | 3/1996 | Nadjafl | |
| 5,540,505 A | 7/1996 | Struziak | |
| 5,547,286 A | 8/1996 | Struziak | |
| 5,584,582 A | 12/1996 | Brown | |
| 5,634,723 A * | 6/1997 | Agrawal | 384/106 |
| 5,833,369 A | 11/1998 | Heshmat | |
| 5,961,217 A | 10/1999 | Heshmat | |
| 6,158,892 A | 12/2000 | Stewart et al. | |
| 6,964,522 B2 * | 11/2005 | Kang et al. | 384/103 |
| 2002/0067872 A1 * | 6/2002 | Weissert | 384/106 |
| 2004/0096130 A1 * | 5/2004 | Saville et al. | 384/106 |
| 2006/0062500 A1 | 3/2006 | Struziak et al. | |

FOREIGN PATENT DOCUMENTS

| | | |
|---|---|---|
| JP | 61-140217 U | 8/1986 |
| JP | 1-109617 U | 7/1989 |
| JP | 2-41654 B2 | 9/1990 |
| JP | 2684765 B2 | 11/1990 |
| JP | 11-503811 T | 3/1999 |
| JP | 2005-155802 A | 6/2005 |

OTHER PUBLICATIONS

International Search Report, Apr. 6, 2006.
Current State of the Art: Two Piece Thrust Bearing.
European Search Report for EP Application No. 08251459.7, Jul. 25, 2008.
Extended European Search Report for Application No. EP 11 00 1887 dated Apr. 5, 2011.

* cited by examiner

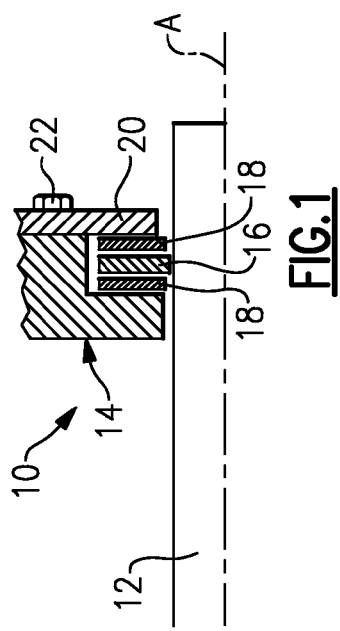
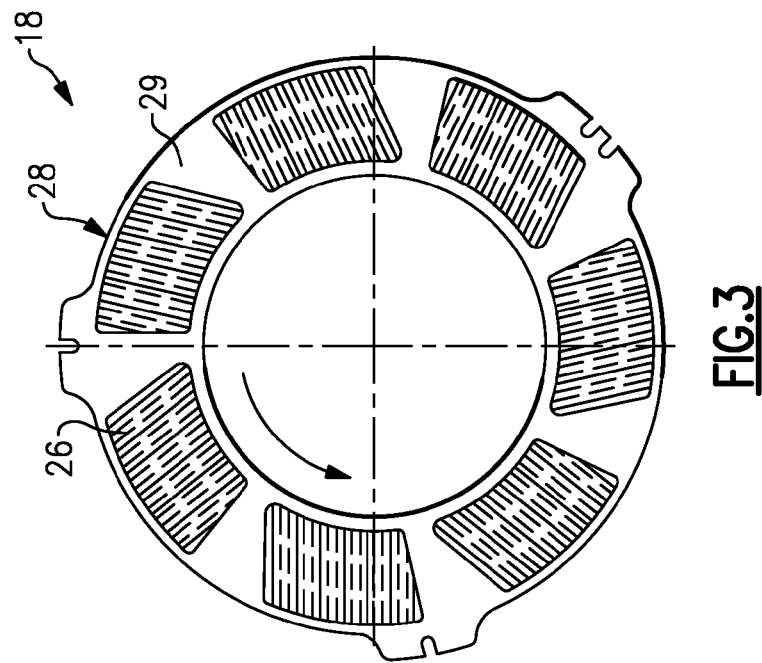
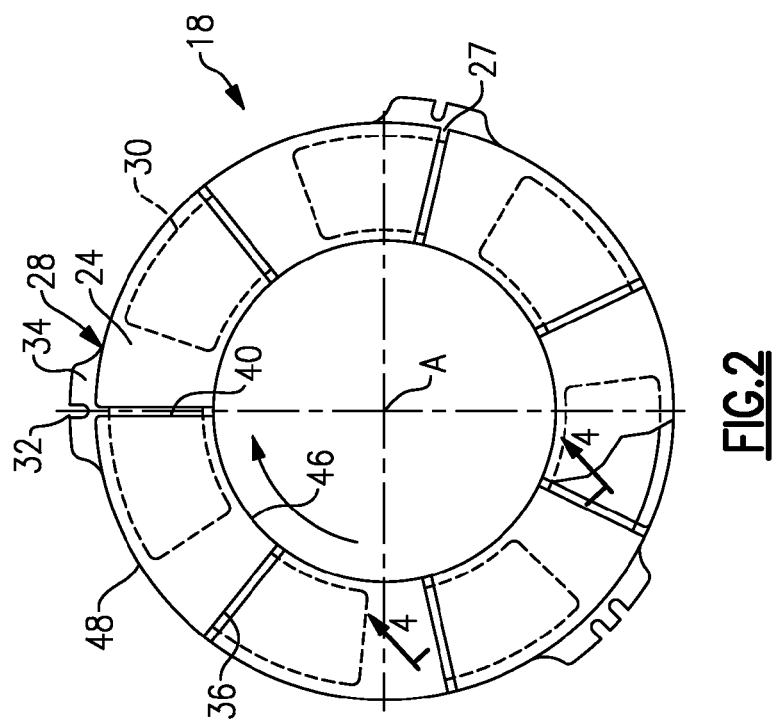

HYDRODYNAMIC BEARING

This application claims priority to U.S. Provisional Application No. 60/913,487, which was filed on Apr. 23, 2007.

BACKGROUND

This application relates to a hydrodynamic bearing. In one example, the hydrodynamic bearing may be used as a thrust bearing in, for example, an air cycle machine, a RAM air fan and/or a motor driven compressor.

Hydrodynamic thrust bearings are used between a stationary component, such as a housing, and a disc or thrust runner that can rotate at speeds in excess of 50,000 rpm. The hydrodynamic bearing operates by sustaining an air film that provides lubrication between the stationary component and the thrust runner. Hydrodynamic bearings must perform at low speeds with a sufficient air film. It is also desirable to manufacture the hydrodynamic bearing with as few parts as possible.

In one prior art arrangement, a hydrodynamic bearing includes a main foil with multiple top foils secured to the main foil. A bump foil is arranged under each of the top foils adjacent to the main foil. Spacers are arranged on the opposite side of the main foil from the top and bump foils. This arrangement requires a more complex top foil design that uses a bend or step to arrange the top foil over the bump foil. This step creates several problems. First, since air pressure is a function of rotation speed, higher speeds are required to generate sufficient pressure for desired aerodynamic top foil performance due to the drag created by the step. Second, the step allowed increased leakage between the foils.

What is needed is a more aerodynamic hydrodynamic bearing. Current air bearings are rather complex and require many parts. Thus, it is also desirable to reduce the number of parts and simplify the manufacturing process.

SUMMARY

A hydrodynamic bearing is provided that includes an annular main foil having axially spaced inner and outer surfaces. Bump foils are supported circumferentially on the outer surface. Top foils are supported circumferentially on the inner surface opposite the bump foils. In one example, spacers are arranged between the top foils and the main foils. The top foil includes a crown portion extending from a leading edge to a trailing edge of the top foil, which provides a gentle bow that is aerodynamically efficient. The spacers can be provided by chemically etching the main foil, in one example, to provide an integral spacer.

The bump foils include first and second corrugated portions respectively providing first and second axially heights. The first axial height is less than the second axial height and is arranged at a leading edge of the bump foil relative to the direction of airflow across the hydrodynamic bearing.

Accordingly, the example embodiment provides a hydrodynamic bearing that sustains an air film at low speeds while reducing the number of parts.

The various features and advantages of this application will become apparent to those skilled in the art from the following detailed description of the example embodiment. The drawings that accompany the detailed description can be briefly described as follows.

BRIEF DESCRIPTION OF THE DRAWINGS

FIG. 1 is a schematic view of a hydrodynamic thrust bearing arranged in a rotating assembly.

FIG. 2 is a top elevational view of an example hydrodynamic bearing;

FIG. 3 is a bottom elevational view of the hydrodynamic bearing shown in FIG. 2.

DETAILED DESCRIPTION OF THE PREFERRED EMBODIMENT

Figure 4:
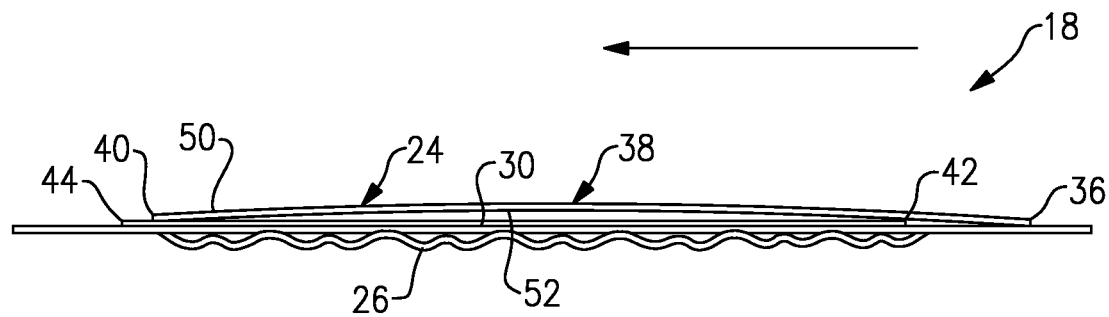
FIG. 4 is a cross-sectional view of the hydrodynamic bearing shown in FIG. 2 taken along line 4-4.

A rotating machine 10, such as an air cycle machine, a RAM air fan or a motor driven compressor, is shown schematically in FIG. 1. The machine 10 includes a shaft 12 rotating about an axis A. The shaft 12 is arranged within a housing 14. An annular thrust runner 16 extends radially from the shaft 12. Thrust bearings 18 are arranged on either side of the thrust runner 16, in the example shown. The thrust runner 16 and thrust bearings 18 are retained between the housing 14 and a housing portion 20, which is secured to the housing 14 by a fastening element 22, for example.

Air is supplied to the thrust bearings 18 by a passage (not shown) in the housing 14. During rotation of the shaft 12 relative to the housing 14, a hydrodynamic layer or air film is generated between the thrust bearings 18 and the thrust runner 16 to reduce friction. This lubricating air film is shown by the arrow in FIGS. 2-4. Air routed to the thrust bearings 18 from the passage is also used to cool the thrust bearings 18.

Referring to FIGS. 2-4, the thrust bearings 18 includes a main foil or plate 28 having axially spaced inner and outer surfaces 27, 29. The inner and outer surfaces 27, 29 are respectively arranged near the thrust runner 16 and housing 14 in the example shown. However, it should be understood that the inner and outer surfaces 27, 29 can be reversed and the terms "inner" and "outer" should not be construed as limiting. The main plate 28 includes tabs 34 having notches 32 that are used to circumferentially locate the thrust bearings 18 relative to the housing 14 to prevent rotation of the thrust bearing.

In the example embodiment, the main plate 28 supports multiple circumferentially arranged top foils 24 arranged on the inner surface 27. An air film is formed on the top foils to reduce friction between the thrust bearings 18 and the thrust runner 16. Multiple bump foils 26 are circumferentially arranged on the outer surface 29 and are generally aligned beneath the top foils 24. The bump foils 26 distribute the axial load from the thrust runner 16 across the thrust bearings 18.

The top foils 24 include a leading edge 36 that is secured to the main plate 28, such as by spot welds. The top foils 24 extend from the leading edge 36 to a trailing edge 40, providing a crowned surface or portion 38 that gently and gradually bows outwardly away from the inner surface 27. The crowned surface 38 can be omitted if desired. The terms "leading" and "trailing" edges are with reference to the direction of airflow indicated by the arrows in FIGS. 2-4. Unlike prior art top foils 24, there is no abrupt step in the top foil 24 at the leading edge 36, which improves aerodynamic efficiency at low speeds enabling creation of a sufficient air film.

In the example embodiment, spacers 30 are arranged between the top foils 24 and the main plate 28 to distribute the axial load from the top foils 24 to the bump foils 26 in a desired manner. An outer surface 50 of the top foils 24 is coated with an anti-friction material, such as Teflon®, to reduce the friction between the top foils 24 and thrust runner 16. An inner surface 52 of the top foils 24 engages a corresponding spacer 30, in the example shown. In the example, the top foils 24 extend radially between inner and outer circumferences 46, 48 of the main plate 28. The spacers 30 are recessed from the inner and outer circumferences 46, 48 such that they are covered at their radial edges by the top foil 24. In the example, the spacers 30 include leading and trailing edges 42, 44. The leading edge 42 is arranged beneath the top foils 24. The trailing edge 44 extends beyond the trailing edge 40 of the top foil 24. In the example shown in FIG. 4, the trailing edge 44 of the spacer 30 is secured to the inner surface, for example by spot welds.

Figure 5:
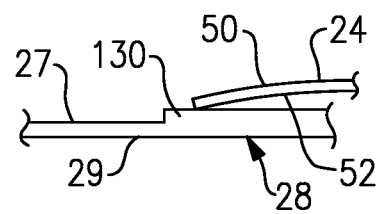
FIG. 5 is an enlarged view of a portion of the hydrodynamic bearing shown in FIG. 4 with a spacer chemically etched in a main foil.

Referring to FIG. 5, a spacer 130 can be provided by the main plate 28 by chemically etching the inner surface 27 of the main plate 28 such that the spacer 130 is provided by a feature that is proud (i.e. protruding) of the inner surface 27. In this manner, the spacer 130 is integrally provided by the main plate 28 thus eliminated a separate spacer.

Figure 6:
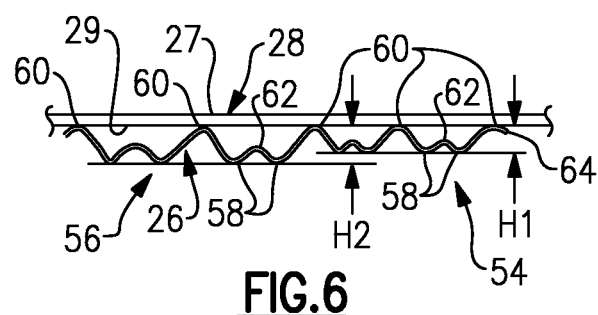
FIG. 6 is an enlarged cross-sectional view of the hydrodynamic bearing shown in FIG. 4 in the area of a leading edge of a bump foil.

The bump foil 26 includes first and second corrugated portions 54, 56, best shown in FIG. 6. The first and second corrugated portion 54, 56 respectively include first and second axial heights H1, H2. The first axial height H1 is less than the second axial height H2. The bump foil is secured by a fastening element 64, such as spot welds, at a leading edge near the first corrugated portion 54 such that the first corrugated portion 54 is arranged between the second corrugated portion 56 and the fastening element 64. In the example show, each of the first and second corrugated portions 54, 56 each include a peak and a valley, which respectively provide the first and second axial heights H1, H2. The valleys 60 are arranged in abutment with the outer surface 29, and the peaks 58 are configured to engage the housing 14. In the example shown, each of the corrugations includes a depression 62 arranged between two peaks 58 with each peak 58 arranged between the depression 62 and a valley 60. The first corrugated portion 54 has a smaller height than the second corrugated portion 56 to improve the aerodynamic efficiency of the airflow over the leading edge of the bump foil 26. In one example, the first axial height H1 is one third the height of the second axial height H2. In another example, the first axial height H1 is three quarters the height of the second axial height H2.

Although an example embodiment has been disclosed, a worker of ordinary skill in this art would recognize that certain modifications would come within the scope of the claims. For that reason, the following claims should be studied to determine their true scope and content.

What is claimed is:

1. A hydrodynamic bearing comprising:
   an annular main foil including axially spaced inner and outer surfaces;
   discrete bump foils supported circumferentially on the outer surface;
   discrete top foils supported circumferentially on the inner surface opposite the bump foils; and
   circumferentially spaced apart spacers supported on and extending from the inner surface arranged immediately beneath and engaging the top foils.

2. The hydrodynamic bearing according to claim 1, wherein the bump foils and top foils are each secured respectively to the outer and inner surfaces at leading edges.

3. The hydrodynamic bearing according to claim 2, wherein the top foils include a trailing edge opposite the leading edge, the top foils having a crowned surface extending from the leading edge to the trailing edge and providing a gradual bow away from the inner surface.

4. The hydrodynamic bearing according to claim 3, wherein the crowned surface is provided by a single bow extending from the leading edge to the trailing edge.

5. The hydrodynamic bearing according to claim 1, wherein the spacers are secured to the inner surface at a trailing edge.

6. The hydrodynamic bearing according to claim 5, wherein the trailing edges of the spacers extend circumferentially beyond trailing edges of the top foils.

7. The hydrodynamic bearing according to claim 5, wherein the spacers are chemically etched onto and extend from the inner surface integral with the main foil.

8. The hydrodynamic bearing according to claim 1, wherein the spacers are integral with the main foil, the spacer proud of the inner surface.

9. The hydrodynamic bearing according to claim 1, wherein the bump foils are secured to the main foil, the bump foils each having first and second corrugated portions respectively providing first and second axial heights from the outer surface, the first axial height less than the second axial height.

10. The hydrodynamic bearing according to claim 9, wherein each bump foil is secured to the outer surface near the first axial height by a fastening element, the first corrugated portion arranged between the second corrugated portion and the fastening element.

11. The hydrodynamic bearing according to claim 10, wherein the fastening element is arranged on a leading edge of the bump foil.

12. The hydrodynamic bearing according to claim 11, wherein the fastening element is a spot weld.

13. The hydrodynamic bearing according to claim 9, wherein each of the first and second corrugated portions includes a peak and a valley, the valleys engaging the surface, the first axial height provided between a first peak and a first valley, and the second axial height provided between a second peak and a second valley.

14. The hydrodynamic bearing according to claim 13, wherein each of the first and second corrugated portions include a depression between a pair of peaks opposite the valleys.

15. A hydrodynamic bearing comprising:
   an annular main foil including axially spaced inner and outer surfaces;
   discrete bump foils supported circumferentially on the outer surface;
   discrete top foils supported circumferentially on the inner surface opposite the bump foils; and
   circumferentially spaced apart spacers chemically etched onto and extending from the inner surface integral with the main foil and arranged immediately beneath and engaging the top foils.

* * * * *